(12) United States Patent
Larose et al.

(10) Patent No.: US 8,166,916 B2
(45) Date of Patent: May 1, 2012

(54) APPETENCE MEASUREMENT SYSTEM

(75) Inventors: Claire Larose, Serent (FR); Marie Le Toux, Grand Champ (FR); Isabelle Guiller, Le Tour du Parc (FR)

(73) Assignee: Specialites Pet Food, Paris (FR)

( * ) Notice: Subject to any disclaimer, the term of this patent is extended or adjusted under 35 U.S.C. 154(b) by 0 days.

(21) Appl. No.: 11/378,997

(22) Filed: Mar. 17, 2006

(65) Prior Publication Data

US 2007/0215055 A1 Sep. 20, 2007

(51) Int. Cl.
- A01K 1/10 (2006.01)
- A01K 5/00 (2006.01)
- A01K 39/00 (2006.01)

(52) U.S. Cl. .................................................. 119/51.02

(58) Field of Classification Search ............ 119/840–842
See application file for complete search history.

(56) References Cited

U.S. PATENT DOCUMENTS

| | | | | |
|---|---|---|---|---|
| 4,060,054 A | * | 11/1977 | Blair | 119/447 |
| 4,462,338 A | * | 7/1984 | Thibault | 119/53.5 |
| 5,906,174 A | * | 5/1999 | Muldoon | 119/54 |
| 5,992,096 A | * | 11/1999 | De La Cerda et al. | 49/169 |
| 6,135,055 A | * | 10/2000 | Pratt | 119/51.02 |
| 2002/0108584 A1 | * | 8/2002 | van der Lely et al. | 119/502 |
| 2003/0226522 A1 | * | 12/2003 | Thibault | 119/842 |
| 2004/0020443 A1 | * | 2/2004 | Ohl | 119/417 |
| 2005/0006153 A1 | * | 1/2005 | Baarsch et al. | 177/25.13 |
| 2005/0161007 A1 | * | 7/2005 | Huisma et al. | 119/842 |
| 2005/0217592 A1 | * | 10/2005 | Larsen | 119/51.02 |
| 2005/0252457 A1 | * | 11/2005 | Morosin et al. | 119/51.13 |
| 2007/0137584 A1 | * | 6/2007 | Travis | 119/51.02 |

\* cited by examiner

*Primary Examiner* — Joshua Michener
*Assistant Examiner* — Valentina Xavier
(74) *Attorney, Agent, or Firm* — Blakely, Sokoloff, Taylor & Zafman

(57) ABSTRACT

The invention refers to appetence measurement for animals.

In particular, the invention proposes an automated system for measuring the appetence of animals, including a feeding area (2) and an accommodation area (1), wherein the feeding area includes a room (3) whose dimensions are chosen so that the animal is able to move therein, and the system also includes access control resources (6, 10-12) that are designed so that the animals can gain access in turn to the room (3) from the accommodation area.

2 Claims, 2 Drawing Sheets

APPETENCE MEASUREMENT SYSTEM

This present invention refers in general to analysing behaviour of animals.

In particular, the invention concerns systems for measuring the appetence of animals, and especially of cats.

It is firstly recalled that appetence can be defined generally as a psychological state corresponding to a desire to consume a food item or a drink, in response to the perception of at least one organoleptic character of this product.

In general, measuring the appetence of an animal therefore includes a stage in which one measures a quantity of product that the animal has ingested after having been driven in this way.

Previous Designs

A known system implementing a system of this type, and intended for cats, is represented in FIG. 1.

The system includes a containment area H separated from a feeding arrangement A.

The containment area is composed of an area which is used as a living space for the cats—some twenty or so cats, for example.

The feeding arrangement A includes several spaces P each having one wall in common with the containment area H.

The system has as many spaces P as there are cats.

Selective access to the spaces P is rendered possible through the use of an electronic identity label worn around the neck of the cats in question.

In addition, in each of the spaces P, the said wall includes a trapdoor T providing selective access, and consisting of a lockable flap which is designed so that a cat can insert its head only.

More precisely, as illustrated in FIG. 2, when the trapdoor is open because the cat to which it is designed has been authenticated, it allows passage of the head but blocks the cat at its shoulders.

In addition, the space P devoted to a cat includes two receptacles holding two products to be tested.

These two receptacles are placed to the left and right of the head of the cat accommodated in the space.

In order to eat, the cat positions itself in front of the access trapdoor to its space P, with the trapdoor locked in the open position by default.

The cat is authenticated by means of its label, and this unlocks the flap of the trapdoor.

The cat can then, typically by pushing with its head, pass the latter through the trapdoor and gain access to the receptacles to left and right at will.

The consumption of the cat is then measured using two balances placed under the two receptacles, and by a computer that can communicate with these balances.

Thus, the individual consumption of each cat can be determined and recorded continuously throughout the day, so as to supply a precise record of their consumption in this period of time.

One advantage of this system is therefore that such a measurement of consumption is effected automatically.

In particular it requires little if any human intervention during the day of testing.

Another advantage is that the receptacles are able to remain at the disposal of the cats during a whole day of testing, which allows their feeding habits to be respected as far as possible, and therefore with as little disruption as possible of their psychological behaviour.

Nevertheless, systems of this type give rise to various problems.

One problem is that the quality of the appetence measurements is not good enough.

In particular, the applicant has determined that these systems cause the animals to develop bad habits, which affects the quality of the said measurements.

By way of a non-limiting example, the cats, or at least a certain number of them, finish by always eating from the same receptacle, namely from that to the left or that to the right, regardless of the product presented.

These cats are therefore not really considering the products, and the measurement of appetence is invalidated as a result.

Another problem, which again concerns the quality or the reliability of the measurements, arises from the fact that the information processed in the database, namely the consumption, is relatively limited.

DESCRIPTION OF THE INVENTION

One objective of the invention is therefore to propose a system for the measurement of appetence which at least partially overcomes the drawback presented above.

In particular, one objective of the invention is to supply an automated system that is of low cost, and whose performance levels are better in terms of quality and reliability.

Another objective of the invention is to provide a system which would increase the measurement options.

To this end, the proposal is for an automated system for measuring the appetence of animals, including a feeding area and an accommodation area, wherein the feeding area includes a room whose dimensions are chosen so that the animal is able to move therein, and where the system also includes access control resources that are designed so that the animals can gain access in turn to the room from the accommodation area.

The preferred, though non-limited, features of this system are as follows:
- the control resources include an airlock which is designed so that only one animal at a time can enter it;
- the airlock is a tunnel;
- the control resources include resources capable of identifying the animals and detecting their entry into and exit from the space;
- the control resources include communicating identity tags designed for each of the animals;
- the room includes an entry door and a separate exit door;
- the system includes presentation resources for two types of product to be compared from the appetence viewpoint, and these presentation resources are arranged in the room so that an animal is able to bypass them;
- in the room, the system includes a support mounted to rotate and designed to support the presentation resources;
- the support includes drive resources to rotate it;
- the system includes resources for weighing the two types of product when these have been placed in the presentation resources.

DESCRIPTION OF THE FIGURES

Other aspects, objectives and advantages of the invention will appear more clearly on reading the description that follows of one method of implementation of the invention, given with reference to the appended drawings, in which.

DESCRIPTION OF A METHOD OF IMPLEMENTATION OF THE INVENTION

Figure 1:
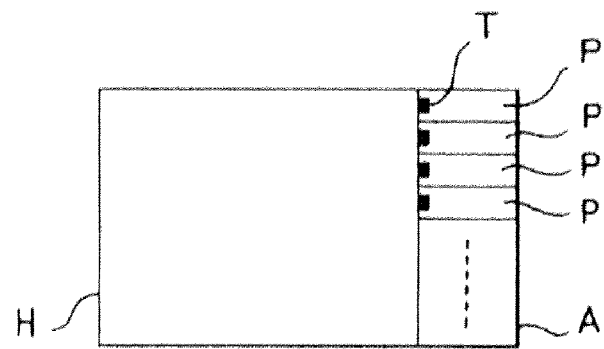
FIG. 1, mentioned previously, illustrates a prior art system, seen in plan from above.
Figure 2:
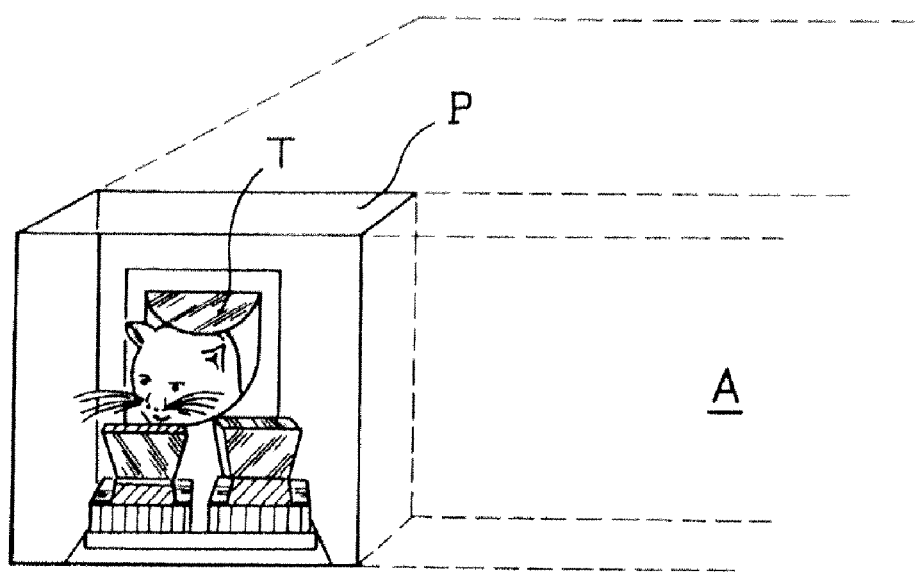
FIG. 2, also mentioned above, illustrated the manner in which a cat gains access to its receptacles in the feeding space assigned to it (view in perspective approximately from the front)
Figure 3:
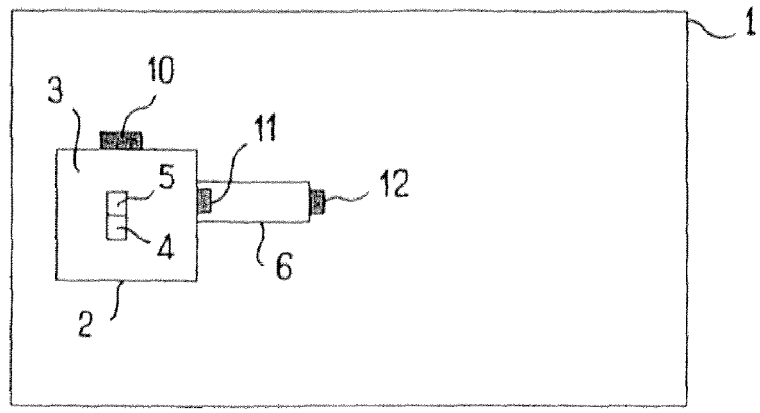
FIG. 3 illustrated a plan view from above of a system of the invention in accordance with a preferred method of implementation.

As illustrated in FIG. 3, a system in accordance with a preferred method of implementation of the invention conventionally includes an accommodation area 1 and a feeding area 2.

The accommodation area has sufficient space to accommodate ten cats, for example.

The feeding area 2 includes a room 3 in which one or more products to be tested have been placed.

Typically, there are two products to be compared, and these are presented in two different receptacles 4 and 5 placed alongside each other.

Of course, there is nothing to prevent the use of a single receptacle with one compartment if one wished to perform a test of the monadic type. Space 3 is dimensioned so that the body of a cat can be accommodated totally.

In particular, in accordance with the preferred method of the invention, the room is sufficiently large to allow a cat to move in it.

In this way, the applicant considers that the psychological behaviour of the cat is particularly well respected.

In particular, the ability to move in room 3 give the cat a feeling that is reasonably similar to that of a cat living with its owner.

As a consequence, the system of the invention has little or no influence on the behaviour of the cat when it wishes to eat or drink.

Apart from this, to the extent that the cat behaves "normally", the quality of these measurements can be improved by analysing its behaviour in relation to one product or another in greater detail.

For example, during each meal, it is possible to analyse its movements, its hesitations to choose, its actual choices, or its way of eating (eats continuously, lifts the head, moves between mouthfuls, etc.).

In accordance with the invention, the analysis of these behaviour patterns can be improved still further by placing the receptacles in the room so that the cat is able to bypass them.

And, in order to improve these behaviour patterns further still, and therefore the quality of the measurements, the receptacles are installed on two supports (not shown in the figures) mounted to rotate, and preferably not visible to the cat.

The supports can both be inclined and turned to different angles.

In particular, in accordance with the preferred method, each support is motor-driven and adjustable remotely, in four 45° sectors about a vertical axis.

Such a support therefore allows the positioning of the products to be changed within the room, and the conditions associated with the visual references of the cats to be controlled. In order measure the quantity of product ingested by a cat, the supports are mounted on weighing resources, typically two table-type electronic balances.

Figure 4:
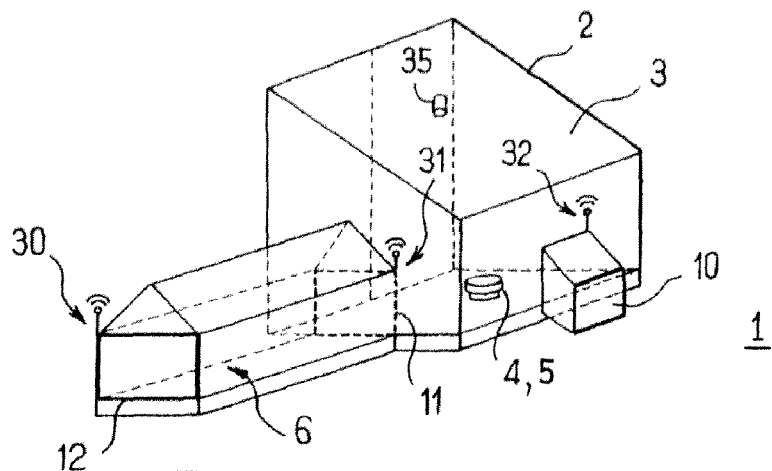
FIG. 4 shows a view in perspective of the airlock and of the space in which the cats feed.

As illustrated again in FIGS. 3 and 4, room 3 preferably includes an entry door 11 and a exit door 10. It will be seen that these two separate doors contribute to the filtration of the entries and exits of the cats in relation to this space.

These two doors typically both take the form of a trapdoor, or cat-flap, controlled electronically, in particular by the locking or unlocking of its action. This locking/unlocking is rendered possible by means of a motor operating a latch.

In addition, trapdoor 10 is arranged mechanically as an exit door from space 3 only, while trapdoor 11 is arranged as the entry door.

In the preferred method of implementation of the invention, the system includes other filtration resources, or other means for controlling the movement of animals in relation to the space.

In particular, each cat has an electronic wireless identity label, in RFID technology for example (Radio Frequency Identification), capable of exchanging information with transceivers installed at each door in particular.

It should be noted here that the identity label can be inserted into a collar worn by the cat.

In addition, entry into the space from the accommodation area 1 is rendered possible through an airlock 6.

In particular, this airlock has the function of guaranteeing that the cats enter into the space one at a time, that is turn and turn about.

To this end, the airlock has a trapdoor at each end, one being the aforementioned trapdoor 11, and the other 12 providing access into the airlock from the accommodation area.

Like trapdoors 10 and 11, trapdoor 12 is controlled electronically, in particular by locking and unlocking.

Apart from this, trapdoor 12 is also arranged mechanically so that it allows only entry into the airlock, and not exit from it.

In order to prevent a cat that is present in the accommodation area from entering into the airlock 6 other than by trapdoor 12, the said airlock can advantageously take the form of a tunnel which is closed at the top and sides.

Note here that, in general, the trapdoors of the system are sufficiently robust to withstand the passage of many cats over time.

Certain parts making up these trapdoors are preferably made of metal or metal alloys.

By way of a non-limiting example, certain plastic parts can be replaced by metal parts.

This approach is particularly valuable where the aforementioned latches are concerned, these being used for locking/unlocking of the flaps.

The system also includes detectors 32, 31, 30, typically fitted with antennae, which are associated respectively with trapdoors 10, 11, and 12.

These detectors are used to validate the actual passage of a cat through these trapdoors.

The detectors are arranged at the trapdoors so as to minimise the interference between them, and to optimise detection of the electronic labels during the passage of the cats.

Figure 5:
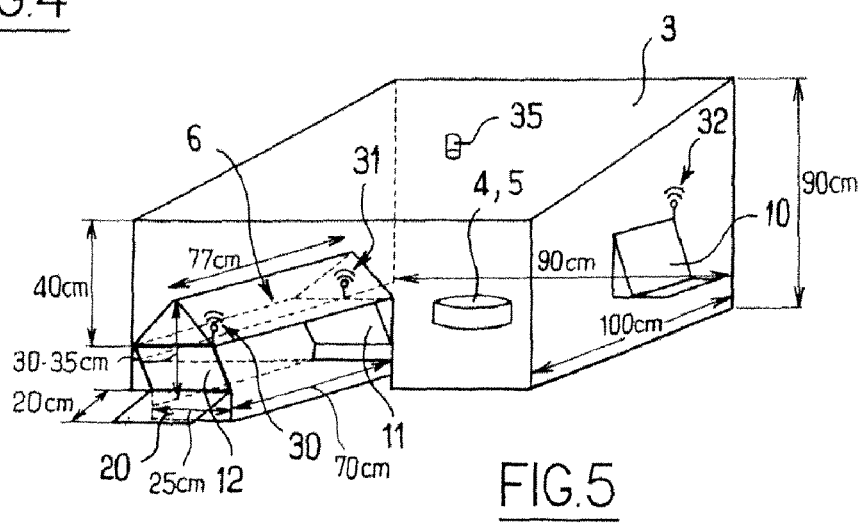
FIG. 5 shows an example of the dimensions of a system according to the invention.

Note that the positions of the detectors as illustrated in FIGS. 4 and 5 are provided only by way of non-limiting examples.

The operation of these detectors will be described later.

The system of the invention also includes data processing resources, typically a computer running an application, in order to determine the appetence measurements from data supplied in particular by the weighing resources.

These resources can thus automatically generate a consumption pattern, and as will be seen, they can even determine an appetence measurement on the basis of information that is even richer than merely the quantities of products consumed.

In fact, in the preferred method of implementation, the computer collects data which come not only from the weighing resources, but also from other sensors which enrich the information on the basis of which the appetence of the cats is measured.

By way of a non-limiting example, the computer can receive video data coming from one or more cameras placed in space 3.

Shown in FIGS. 4 and 5, by way of a non-limiting example, is a camera 35 installed in the ceiling of space 3.

The computer therefore has a view from above.

The video system allows account to be taken of the behaviour mentioned above in particular, in the measurement of appetence (hesitation to choose, continuous eating, etc.).

More generally, the system therefore allows the complete ethogram of a meal to be obtained, together with the frequency of each of the behaviours identified, and therefore their degree of significance in any analysis.

The same computer also exchanges data with the detectors at the trapdoors.

These data concern, in particular, the identity number of a cat that has just passed through a trapdoor, this number having been supplied by the electronic label communicating with the detector in question.

They also concern the commands for locking or unlocking of the trapdoors.

Thus, the computer and its application also contribute to the control and filtration of the entries into room 3.

Of course, the computer and its programme can have many other functions.

By way of a non-limiting example, they can manage remote control of the rotation of the receptacle supports about the vertical axis.

Human intervention is thus even less necessary.

FIG. 5 shows a detailed example of space 3 and of the airlock 6.

In particular, this figure shows the dimensions of these elements that the applicant considers to be particularly appropriate. It is also possible to see that the trapdoors 10, 11 and 12 can be raised by a few tens of centimeters in relation to the floor in order to facilitate the detection of labels, the passage of the cats, and the closure of these trapdoors.

Again, it is possible to see that entry via trapdoor 11 can be facilitated by means of a plane 20 which is inclined in relation to the horizontal.

This plane is located in front of the raised trapdoor 11, and meets the floor at one edge and trapdoor 11 at the opposite edge.

Of course, it is also possible to use a plane of this type at the entrances and exits of trapdoors 10 and 11, respectively.

One method of operation of the system will now be described, in accordance with the preferred method of the invention.

To begin with, it is assumed that room 3 and the airlock 6 are empty.

The cat-flaps are locked by default.

A cat positions itself close to the entry trapdoor 12 of the airlock.

The data emitted by its electronic label are received by the reception resources associated with the said trapdoor 12 and transmitted to the computer.

The programme is able to verify that no cat is located in feeding area 2, and in this event, commands the unlocking of trapdoor 12.

By presenting itself at the unlocked trapdoor 12, the cat activates the associated detector, and this triggers the opening of this trapdoor.

If the cat reverses, it interrupts its action on the detector so that trapdoor 12 closes again.

However since the cat is still in front of the latter, the label is again detected.

As a consequence, trapdoor 12 remains unlocked.

On the other hand, in the event that the cat advances sufficiently forward, and thus validates its passage, the said detector is no longer activated and trapdoor 12 closes again behind the cat.

Given the mechanical arrangement of the aforementioned trapdoor, it is no longer possible to re-exit via this route.

Apart from this, once the cat is in the airlock, the said trapdoor 12 is locked again.

With the cat continuing to advance in the airlock, trapdoor 11, in its turn, receives the identity data of the cat by means of its label.

Trapdoor 11 is unlocked.

The cat operates the detector associated with trapdoor 11, and so the latter opens and provides access to room 3, and in particular to the feeding receptacles.

Note that during passage in the airlock, whether at the moment when the cat passes trapdoor 11 or trapdoor 12, the identity number associated with the label is recorded in the computer.

Of course, it is possible to choose to limit recording to the cat's passage through trapdoor 11 only.

This recording process is then used to establish a link between the cat in question and the data that concern it, and which are used for the measurement of appetence.

In addition, this recording process facilitates access management in relation to room 3.

In particular, when the computer and its programme observe that the cat is in room 3, they deny access to the other cats until the said cat has left again (necessarily via trapdoor 10).

When the cat has entered room 3, trapdoor 11 closes behind it and is locked again.

The behaviour of the cat is analysed by means of the above-mentioned sensors present in room 3, and in particular by means of the balances and the video camera.

The observation data are recorded, typically on a data storage hard disk in the computer.

Recorded in particular are the weights measured throughout the meal, the number of separate mouthfuls taken per predetermined period, the movements (number of times around the receptacles, period of time between entry into and exit from the space, etc.), hesitations, and so on.

After it has eaten, the cat positions itself in front of the exit trapdoor 10.

After identification, the computer unlocks this trapdoor, the cat activates the associated detector, the door opens, the cat leaves, and the trapdoor closes again.

In addition, the exit of the cat is recorded in the computer.

Before making room 3 accessible to other cats, the computer unlocks trapdoor 11 for a predetermined a period of time (preferably 10 seconds), so that if a cat should happen to still be in the airlock (the particular case in which two cats have entered after each other into the airlock), then this cat will be able to enter into the space in its turn.

When the said period of time has expired, the computer determines whether there is still a cat in the space.

If not, the latter is again considered to be accessible to a cat.

Thus trapdoor 12 can be unlocked when cat positions itself in front of it.

In the latter case, the airlock remains locked until the computer determines that there is no longer any cat in space 3.

Of course, a professional engineer will understand that other obvious methods of operation can characterise this system.

Note also that this present invention is not limited in any way to the form of implementation described above and shown in the drawings.

In particular, instead of remotely controlling the rotation of the receptacle support, it is possible to choose that a person effects this manually.

In addition, in the method of implementation presented above, the feeding area is located within the accommodation area, but the professional will understand that the invention is not limited in any way to such a configuration of the spaces.

In particular, the feeding area can be located alongside the accommodation area in the event that they are separated.

Moreover, room 3 can have more than one exit trapdoor of the trapdoor 10 type (such as two trapdoors arranged in opposite walls of room 3, for example).

Also, since the system of the invention will provide a saving of space in relation to the systems of previous design, it is easily possible to create a collection of several systems in accordance with the invention.

Such a collection of systems can be used advantageously to acquire appetence measurements much more rapidly.

In addition, the system of the invention is not limited to appetence measurement for cats.

In this regard, the professional engineer will know how to effect the necessary modifications to the system in order to accommodate other animals.

The invention claimed is:

1. An electronic automated system for measuring the appetence of animals comprising:

an accommodation area comprising at least one feeding area, wherein the feeding area comprises a room dimensioned so that an animal is able to move therein;

access control resources dimensioned so that only one animal at a time can gain free access to said room of the feeding area from the accommodation area and further comprising identifying resources for automatically identifying each animal and automatically detecting its entry into and exit from the room of the feeding area, wherein said identifying resources include an electronic label worn by each of the animals, an electronic lock and means for locking and unlocking said electronic lock by means of a motor operated latch coupled to a trap door, based on a position of said electronic label;

presentation resources for at least two types of products to be evaluated or compared from the appetence viewpoint, wherein the presentation resources include automated weighing means for weighing the quantities of the product(s) consumed and a rotary support to arbitrarily change the relative position of the products so as to obtain an accurate response based on appetence in relation with said product(s), the presentation resources being arranged within the feeding area so that the animal is able to bypass them, data processing resources which automatically generate a consumption pattern from data supplied by the weighing means, and a video camera supplying behavior data of the animal, the animal behavior data being combined with said automatically generated consumption pattern to generate a complete ethogram.

2. An electronic automated system for measuring the appetence of animals according to claim 1, wherein said consumption pattern is automatically generated from data supplied by the weighing means.

\* \* \* \* \*